Sept. 27, 1960   C. T. PARKER   2,954,235
MATERIAL UNLOADER WITH LONGITUDINALLY SHIFTABLE SHAFT
Filed June 4, 1958
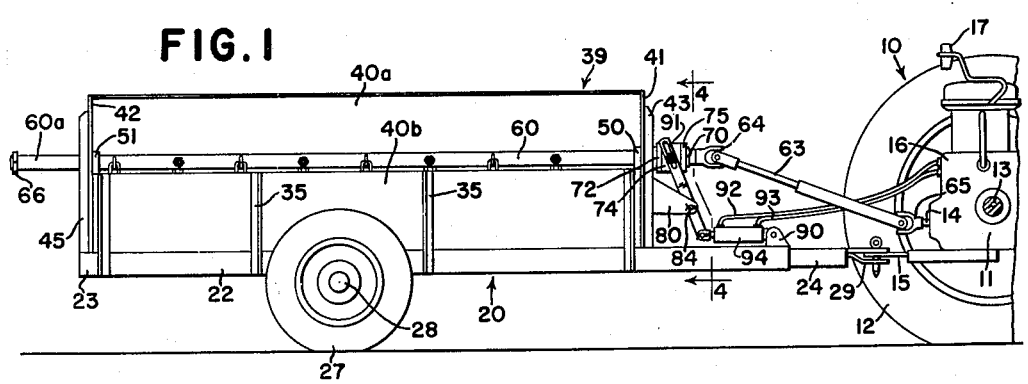
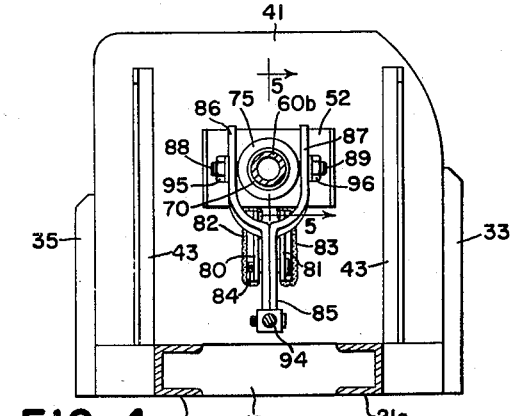
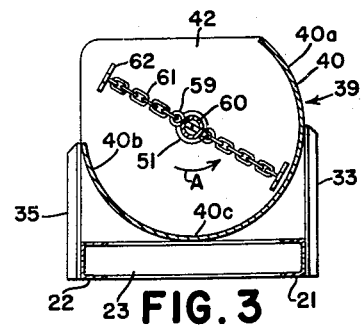
INVENTOR.
C. T. PARKER
BY
C. T. Parker and W. A. Murray
ATTORNEYS

2,954,235
Patented Sept. 27, 1960

2,954,235
MATERIAL UNLOADER WITH LONGITUDINALLY SHIFTABLE SHAFT

Charles T. Parker, Moline, Ill., assignor, by mesne assignments, to Deere & Company, a corporation of Delaware Filed June 4, 1958, Ser. No. 739,923

8 Claims. (Cl. 275—3)

This invention relates to a material unloading implement. Still more particularly this invention relates to a manure spreader of a new and novel design and its associated drive mechanism.

Present day conventional manure spreaders feature a box-type body having a material conveyor moving over its bottom to feed manure or like material rearwardly to rear mounted beaters and widespread members from where it is fed from the rear of the spreader. In this type of spreader considerable expense is required to build and maintain the drive mechanisms which operate the floor conveyor, the beaters, and the widespreads. Since the spreader is normally operated from the power take-off shaft on a tractor, the overall capacity of the spreader is limited so as to not overload the power take-off shaft. Also, it is often difficult due to the inherent characteristics of the material, to evenly distribute manure in a completely pulverized or reduced state which is the desired manner of distribution.

In U.S. Patent 2,886,332, issued to Keith D. Elwick, there is therein described a material unloading implement of a nature considerably different from the above-described manure spreader. The structure comprises a main frame supporting an elongated material container having a partial cylindrical body. Supported on the container is a longitudinal shaft concentric with the axis of the cylindrical container. Axially spaced on the shaft are a series of flexible arms which operate, upon rotation of the shaft to feed material over one side of the material container and onto the ground.

There are considerable advantages to the type of mechanism shown and described in the Elwick patent. One of the primary advantages is that the flexible arms operate as beaters to completely pulverize the material as it is discharged. Also of value is the simplicity of the unloading implement which reduces the overall manufacturing cost as well as the maintenance cost of the unit. Further, it has been found that the Elwick type of material unloader is more efficiently operated inasmuch as there is required only a single drive unit and only a single driven element for the entire unloader.

One of the drawbacks of the aforedescribed type of unloader is that by placing the flexible arm elements axially along the shaft so as to unload material throughout the container, there is normally a very large initial load on the power take-off shaft and, depending upon the type of material to be unloaded, there may be a considerably large load on the power take-off shaft throughout the operation. The large initial load on the shaft is caused by the condition which arises due to the fact that the flexible arms must be drawn from an immobile state through the material. Since there are normally provided drags on the ends of the flexible arms, a large resistance is caused by the material to initial movement of the flexible arms. It is therefore one of the main objects of this invention to provide a simple mechanism for reducing the initial load on the power take-off shaft as well as reducing the load on the shaft throughout its operation.

Specifically, it is desired to provide a longitudinal shaft within the container which has a reduced or small number of flexible elements spaced axially on the shaft. In the particular species shown, there is provision for reducing the number of flexible elements at least fifty percent and consequently the load on the power take-off shaft will also be reduced fifty percent. Further, it is proposed to mount the shaft so it is movable axially. Therefore, after the material has been removed from half of the material unloader, the shaft may be moved and the elements moved into the areas which have not been unloaded. It may readily be understood that by providing an axially movable shaft and by properly decreasing or increasing the number of flexible elements, the unloader itself may be adjusted relative to its power input requirement to the power output capacity of any size tractor. Thus, a relatively small tractor may be utilized as the power source for a comparatively large capacity material unloader.

It is still a further object of the invention to provide axial movement of the aforesaid shaft by use of a lever system which is operated from a remote hydraulic cylinder of the tractor and consequently may be controlled from the operator station on the tractor. Since the power is received from the power take-off shaft on the tractor, suitable extensible and retractable drive means are provided to accommodate axial movement of the shaft.

Other objects and advantages of the invention will become apparent to those skilled in the art as the nature of the invention is better understood from the following description and as shown in the accompanying drawings.

Fig. 1 is a side elevation of a material unloader and tractor assembly. The rear wheel of the tractor has been removed for purposes of clarity.

Fig. 2 is an enlarged plan view of the material unloader.

Fig. 3 is a sectional view taken substantially along the line 3—3 of Fig. 2 showing machine in operation.

Fig. 4 is an enlarged sectional view taken along the line 4—4 of Fig. 1.

Fig. 5 is a sectional view taken along the line 5—5 of Fig. 4 and drawn to a still larger scale.

Referring now to Fig. 1, the tractor 10 is of conventional form having an elongated body 11 supported at its forward end by front steerable wheels, not shown, and at its rear by rear traction wheels, the left traction wheel being indicated at 12, and a rear transverse axle structure 13. The tractor 10 is also characterized by having a conventional power take-off shaft 14 extending rearwardly from the tractor body 11 and a drawbar 15 fixed to the underside of the tractor body 11. A hydraulic system is provided in the tractor and is enclosed within the housing 16.

The tractor is operated from an operator station indicated by the seat 17, with the control levers for operating the power take-off shaft 14 and the hydraulic system being available at that station.

The material unloader or manure spreader includes an elongated main frame 20 including left and right hand channel members 21, 22 respectively running lengthwise of the spreader, interconnected at their rear ends by a transverse member 23 and at their forward ends by a transverse channel member 19 and forwardly converging portions 21a, 22a of the side channel members 21, 22. The forward portions 21a, 22a connect at their forward ends. The frame 20 is extended forwardly from the forward ends of the converging members 21a, 22a by a tongue or draft member 24 which is rigid with the converging portions 21a, 22a.

The main frame 20 is supported at its mid-portion by a pair of transversely spaced apart wheels 26, 27 which are carried on a transverse axle 28, and at its forward end by means of the tractor drawbar 15 which is connected to the main frame 20 by a conventional type clevis connection 29.

Upright angle irons 33 have their lower ends welded to the outer surface of the left hand channel member 21. Similarly upright angle irons 35 are welded at their lower end to the right channel member 22. The angle irons 33 and 35 serve as lateral support for a material container 39. The container 39 has a partial cylindrical and longitudinally extending body or shell 40. The cylindrical shell 40 opens upwardly with one side 40a extending upwardly relative to the other side 40b. In a sense the cylindrical shell 40 may be treated as a U-shaped member having the opposite side walls 40a, 40b connected by a bottom wall 40c. The purpose of the wall 40a extending upwardly relative to its opposite wall 40b is to prevent material from flowing over that side of the container. As may be seen from viewing Fig. 3, the cylindrical shell 40 has a diameter substantially equal to the distance between the angle iron members 33, 35 and is seated between those members so as to receive lateral support therefrom. The container 39 also includes therein a front wall 41 and a rear wall 42 which are fixed by welding or other suitable means to the opposite ends of the cylindrical shell 40. Angle iron members 43 extend upwardly from the front transverse beam 19 and support the front wall 41 longitudinally. Similar angle iron members 45 extend upwardly from the rear transverse beam 23 and offer support for the rear wall 42. The walls 41, 42 are rectangular in shape except for the upper left corner which follows generally the contour of the left side 40a of the cylindrical shell 40.

A reenforcing plate 52 is fixed to the front wall 41 and offers additional support for a bearing 50. A similar plate 53 is provided on the rear wall 42 and serves to reenforce the wall for receiving a rear bearing 51. Consequently, the bearings 50, 51 are basically supported by the main frame although they are directly supported by the end walls 41, 42. A longitudinally extending main shaft 60 is positioned substantially on the axis of the cylindrical body 40 or centrally between the side walls 40a, 40b and above the bottom wall portion 40c. Extensible and flexible arm elements or flails in the form of link chains 61 are removably connected to the shaft 60 at their inner end or shaft proximate ends by means of eye bolts 59 extending through the shaft 60. The free or outer ends of the chains 61 are characterized by having a drag 62 composed of either a blade or in this instance by a pair of cross rods which, as will later be explained, drag through the material for purposes of better driving the material from the container.

A forward extension 60b of the shaft 60 projects forwardly from the bearing 50 and is connected to a drive shaft 63 by means of a universal joint 64. The drive shaft 63 is composed of two axially alined parts which telescope so as to permit extension or retraction of the drive shaft 63. A second universal joint is provided at the forward end of the drive shaft 63 and is connected in turn to the power take-off shaft 14 on the tractor 10.

Fig. 3 shows the flexible arms or links 61 in their fully extended positions which would occur when the container 39 is generally empty or upon the chains and their associated drags 62 clearing a radial path of material. In initial operation of the unit which occurs when the container 39 is full of manure or other such material, the chains 61 will, upon initial rotation of the shaft 60, wind about the shaft 60 so that only the material next adjacent to the shaft will be driven near the wall 40b. As material is removed, the chains 61 will tend to extend themselves so that the drags 62 will always contact the material next adjacent to the shaft and will continue to extend themselves until they reach a position substantially shown in Fig. 3 at which time all material in the path of rotation of the chains 61 and drags 62 will have been removed from the container.

Referring again to the shaft 60 and particularly to Figs. 1 and 2, it will be noted that the shaft 60 is of considerably greater length than the length of the container. The shaft 60 has a portion 60a extending rearwardly from the rear wall 42 as well as the portion 60b extending forwardly of the front wall 41. The rearward end of the extension 60a has a stop ring 66 fixed thereto. The forward extension 60b has a groove 69 for receiving a snap ring 70. Fixed on the forward extension 60b by welding 71 is a ring 72. Adjacent to and forward of the ring is a bearing 73 contained within a covering or housing 74. Forwardly of the housing 74 is a second ring 75 which abuts the housing 74 and is held in its axial position by the snap ring 70. The bearing 50 includes therein an outer housing shell 54 and an internal bearing 55. The bearing 51 at the rear of the container is similar to the bearing 50 and the main feature concerning both bearings is that they permit both rotational and axial movement of the shaft 60.

A pair of transversely spaced forwardly projecting lugs or brackets 80, 81 are welded as at 82, 83 to the front wall 41. The lugs 80, 81 are provided at their forward ends with a pivot pin 84. A vertically disposed yoke or lever member 85 is pivotally mounted on the pin 84 and has upper bifurcated leg portions 86, 87 extending on opposite sides of the bearing housing 74. The lower portion of the yoke or lever is positioned between the brackets 80, 81. The leg portions 86, 87 are bolted, as at 88, 89 to the bearing housing 74. The lower end of the yoke 85 is pivotally connected to the ram end of a remote hydraulic cylinder 94. The cylinder is supported at its cylinder end by means of a pair of upwardly extending lugs 90 which are fixed to the forward ends of the beam portions 21a, 22a. Hydraulic hoses 92, 93 extend from the hydraulic system contained in the housing 16 of the tractor to the hydraulic cylinder 94.

The yoke legs 86, 87 are provided with elongated slots such as is shown at 91 for receiving the bolts 88, 89. Nuts 95, 96 on the bolts are provided for the bolts 88, 89 so as to restrict axial movement of the yoke relative to the bolts.

In operation, the manure spreader or material unloader will function in the following manner. The shaft 60 will be driven in a counterclockwise rotation as indicated by the arrow A. This will cause the chains 61 and drags 62 to throw the material within the container 39 over the upper edge of the wall portion 40b. Viewing Fig. 2, it may be seen that there is longitudinal or axial spacing between the adjacent chains 61. Consequently, there would normally be a radial groove cut by the chains through the material which would be emptied leaving therein mounds of material between the chains. By operating the remote cylinder 94 so as to extend the ram, the yoke or lever 85 will pivot about the pivot pin 84 so that the leg portions 86, 87 will move the main shaft 60 axially forward. The shaft 60 may be moved forwardly to any position between that shown and that in which the stop ring 66 engages the rear bearing 51, this latter position being shown in dotted representation in Fig. 2. This will effect movement of the chains 61 so that the space between adjacent chains may be emptied of material. Axial movement of the shaft 60, therefore, not only has the advantage of reducing the number of flexible arms or chains required to clear the container properly, but also in effect provides for a more efficient cleaning out of the container since the hydraulic cylinder 94 may be extended or retracted at will by the operator thereby completely cleaning the container of material. Also, as mentioned, the overall load on the power take-off shaft is reduced and the overall capacity of the unit may be increased to fully utilize the full power of the tractor. Since the drive shaft 63 is telescoped, the shaft will increase or decrease in length to accommodate axial adjustment of the main shaft 60 without effecting rotation of the shaft 60.

While only one form of the invention has been shown, it should be recognized that other forms and variations will occur to those skilled in the art without departing from the broad principles of the invention. It should therefore be understood that while the invention was described in detail for the purpose of clearly and concisely illustrating the principles of the invention, it is not intended to narrow or limit the invention beyond the broad general nature set forth in the appended claims.

What is claimed is:

1. A material unloading implement comprising: frame structure including an elongated material container having a pair of oppositely disposed side walls interconnected by a bottom wall; shaft means extending longitudinally of the container between the side walls and above the connecting wall; means on the shaft means including arm elements having shaft-proximate ends and free ends, said arm elements being extensible radially from the shaft means whereby the free ends may move between positions proximate to and spaced from the shaft means, said arm elements being axially spaced on the shaft means to provide longitudinal areas therebetween and within the container unaffected by movement of the arm elements; means on the frame structure supporting the shaft means for rotational and axial movement; and means supported on the frame structure and connected to the shaft means for effecting movement of the shaft means axially for moving the arm elements into the aforesaid longitudinal areas.

2. A material unloading implement adapted for connection to a tractor having a power take-off shaft, a hydraulic system including a remote cylinder, and an operator station positioned on the tractor for operation of the cylinder and power take-off shaft, the implement comprising: mobile frame structure; an elongated material container having a pair of oppositely disposed side walls interconnected by a bottom wall and closed at opposite ends by end walls; a main shaft extending longitudinally of the container between the side walls and above the connecting wall, the main shaft extending between the end walls and having at least one end portion projecting outwardly of an end wall; radial arm elements axially spaced on the shaft; journal means on the end wall supporting the main shaft for rotational and axial movement; a lever fulcrumed to the frame structure; means connecting the lever to the shaft; means mounting the remote cylinder on the frame structure; means connecting the cylinder to the lever thereby effecting axial movement of the main shaft by adjustment of the cylinder; drive means connected to the main shaft adapted for connection to the power take-off shaft on the tractor for effecting rotation of the main shaft, said drive means including an extensible and retractable drive shaft for accommodating axial movement without affecting rotational movement of the main shaft.

3. A material unloading implement adapted for connection to a tractor having a hydraulic system including a remote cylinder, the implement comprising: mobile frame structure; an elongated material container having a pair of oppositely disposed side walls interconnected by a bottom wall and closed at opposite ends by end walls; a rotatable main shaft extending longitudinally of the container between the side walls and above the connecting wall, the main shaft extending between the end walls and having at least one end portion projecting outwardly of an end wall; radial arm elements axially spaced on the shaft; journal means on the end walls supporting the main shaft for rotational and axial movement; a lever fulcrumed to the frame structure; means connecting the lever member to one end of the shaft; means mounting the remote cylinder on the frame structure; and means connecting the cylinder to the lever thereby effecting axial movement of the main shaft by adjustment from the operator station.

4. A material unloading implement adapted for connection to a tractor having a hydraulic system including a remote cylinder, and an operator station positioned on the tractor for operation of the cylinder, the implement comprising: mobile frame structure; an elongated material container opening upwardly and having opposite end walls; a main rotatable shaft extending between the end walls; radial arm elements axially spaced on the shaft; journal means on the frame structure supporting the shaft for rotational and axial movement; means for mounting the remote cylinder on the frame structure; and means for connecting the cylinder to the main shaft for effecting axial movement of the shaft from the operator station on the tractor.

5. A material unloading implement comprising a frame structure; an elongated material container opening upwardly and having opposite end walls; a main rotatable shaft extending between the end walls; radial arm elements axially spaced on the shaft; journal means on the frame structure supporting the shaft for rotational and axial movement; and means supported on the frame structure connected to the main shaft for effecting axial movement of the shaft.

6. A material unloading implement comprising a mobile frame, a material container mounted on said frame and having an upper opening through which the material is discharged, a rotatable shaft extending through said container across said opening, a plurality of axially spaced flail arms attached to said shaft and adapted to discharge material through said opening upon rotation of said shaft, bearing means supporting said shaft on said frame and providing for both rotary and axial movement of said shaft relative to said container, means connected with said shaft for adjustably determining the axial position thereof relative to said container, and means coupled with said shaft for rotating the latter in any axially adjusted position thereof.

7. A material unloading implement comprising a mobile frame, a material container mounted on said frame and having an upper opening through which the material is discharged, a rotatable shaft extending through said container across said opening, a plurality of axially spaced arms attached to said shaft and adapted to discharge material through said opening upon rotation of said shaft, means supporting said shaft on said frame and providing for both rotary and axial movement of said shaft relative to said container, means connected with said shaft for adjustably determining the axial position thereof relative to said container, and means coupled with said shaft for rotating the latter in any axially adjusted position thereof.

8. The invention defined in claim 7 in which the arms are detachably attached to the shaft for reducing or increasing respectively the power input requirement for rotating the shaft.

References Cited in the file of this patent

UNITED STATES PATENTS 574,798    Gohm  ------------------ Jan. 5, 1897